United States Patent
Lee

(10) Patent No.: US 6,459,903 B1
(45) Date of Patent: Oct. 1, 2002

(54) METHOD AND SYSTEM FOR LOCATING MOBILE STATION IN MOBILE TELECOMMUNICATION SYSTEM

(75) Inventor: Myung-Su Lee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/524,398

(22) Filed: Mar. 13, 2000

(30) Foreign Application Priority Data

Mar. 11, 1999 (KR) ............................................. 99-8023

(51) Int. Cl.$^7$ ................................................. H04Q 7/20
(52) U.S. Cl. ........................................ 455/456; 342/457
(58) Field of Search ................................. 455/456, 422, 455/524, 67.1, 440; 701/207, 200, 204, 209; 342/450, 451, 457, 458, 463, 465

(56) References Cited

U.S. PATENT DOCUMENTS

| | | | | |
|---|---|---|---|---|
| 5,444,450 A | * | 8/1995 | Olds et al. ................... | 342/357 |
| 5,926,133 A | * | 7/1999 | Green, Jr. .................... | 342/363 |
| 6,208,297 B1 | * | 3/2001 | Fattouche et al. .......... | 342/450 |
| 6,212,391 B1 | * | 4/2001 | Saleh et al. .................. | 455/456 |
| 6,249,252 B1 | * | 6/2001 | Dupray ........................ | 342/450 |
| 6,269,247 B1 | * | 7/2001 | Chiodini ...................... | 455/456 |
| 6,300,905 B1 | * | 10/2001 | Chen et al. .................. | 342/458 |

* cited by examiner

*Primary Examiner*—Edward F. Urban
*Assistant Examiner*—Naghmeh Mehrpour
(74) *Attorney, Agent, or Firm*—Steven Cha; Klauber & Jackson

(57) ABSTRACT

A method of locating a mobile station is provided. In the present invention, the mobile station is capable of communicating with at least three base stations, each having at least two antennas. To estimate the location of the mobile station, the distance between the mobile station and each base station is calculated based on the time of arrival (TOA) of a mobile station signal at the base station, a first estimated MS location area is defined as an overlap area of circles of which the radiii are the distances between the MS and the base stations. Then, the location of the mobile station is estimated based on the time of signals received through the two antennas of each base station and based on the angle between the antennas of each base station and the mobile station. Here, the angle is calculated from the phase difference between the received signals and a communication frequency of the signals. A second location area is defined as an area defined by lines connecting the base stations to the mobile station. Then, the MS is determined to be located in a common area of the first and the second location areas.

10 Claims, 8 Drawing Sheets

METHOD AND SYSTEM FOR LOCATING MOBILE STATION IN MOBILE TELECOMMUNICATION SYSTEM

CLAIM OF PRIORITY

This application makes reference to, incorporates the same herein, and claims all benefits accruing under 35 U.S.C. Section 119 from an application for "Method and System for Locating Mobile Station in Mobile Telecommunication System" filed in the Korean Industrial Property Office on Mar. 11, 1999 and there duly assigned Serial No. 1999-8023.

BACKGROUND OF THE INVENTION

1. Field of the Invention

The present invention relates generally to a cellular mobile telecommunication network, and in particular, to a method and system for locating a mobile station (MS) in a CDMA (Code Division Multiple Access) cellular network.

2. Description of the Related Art

The goal of a cellular mobile telecommunication network is to allow any registered subscriber to make a call to anyone at any place and time. FIG. 1 illustrates a typical mobile telecommunication network configuration. Referring to FIG. 1, the mobile communication network is comprised of a plurality of base stations (BSs) 21 to 24, a mobile station (MS) 10, a base station controller (BSC) 30 for controlling the BSs 21 to 24, and a mobile switching center (MSC) 50 for connecting the BSC 30 to another BSC or a public switched telephone network (PSTN).

In the thus-constituted cellular mobile telecommunication network, the whole service area is divided into a plurality of coverage areas of BSs. Each BS coverage area is called a cell. The MSC 50 controls the BSs 21 to 24 so that a subscriber can continue his or her call connection without interruption while moving between cells.

The MSC 50 can reduce the time required for processing a call by accurately locating the cell where the subscriber is located. In case of an emergency, such as fire or a situation where a patient needs first aid treatment, the mobile subscriber should be accurately located. Tracking the location of a mobile subscriber within a cell in a mobile telecommunication network is known as location service.

The MS can be located within the boundary of a given cell by the inter-working function of the MS or by the mobile telecommunication network.

In the former case, the MS is provided with a GPS (Global Positioning System) receiver to calculate its location in latitude and longitude coordinates based on the location information received from the satellite through the GPS receiver. The requirement of the extra GPS receiver, however, increases the manufacturing cost and the size of the MS.

As an alternative to the self-locating method using the satellite, the MS implements a signal receiver to calculate its location by trigonometry, which is based on the signals received from at least three BSs. This method also increases the cost and size of the MS due to the requirement of a separately procured signal receiver. Moreover, the MS can not operate compatibly with some BSs using a different form of signal.

As stated above, the self-locating method increases the load on the MS as it is required to calculate its location. As a result, errors might occur in the calling process of the MS.

In the case that the network is involved to locate the MS, at least three BSs receive a signal from the MS. The network calculates the distance between the three BSs and the MS using the arrival time of the signal at the BSs, then determines the location of the MS using the trigonometry. This location service is provided generally by a location data processor 40 included in the BSC or is provided independently. Upon request for a location service about a specific mobile subscriber, i.e., MS by a user, the BSC 30 selects the BSs 21, 22, and 23 for use in the location service in order to locate the MS. The network can calculate the location of the MS using the time of arrival (TOA) or the time difference of arrival (TDOA).

The TOA method calculates the distance between the MS and the BS based on the TOA of a signal received at each BS from the MS. It is assumed that the MS is located at the intersection point of three circles whose respective radius is the respective distance between each BS and the MS.

The TDOA method assumes that the TDOAs of a signal transmitted from the MS at each of the three BSs define a set of points on a hyperbola and the MS is located at the intersection point of at least three hyperbolas. The implementation of this method requires accurate synchronization of each BS, as compared to the TOA method.

As described above, the network tracks the location of an MS using a specific signal transmitted from the MS. However, the MS signal is often propagated to a BS in a longer path than the actual distance between the MS and the BS due to the multipath fading and the NLOS (Non-line-of-sight) effect in a real mobile telecommunication environment. In this case, at least three circles or hyperbolas do not meet at one point but overlap an area, and the location area of the MS is estimated to be too large. Therefore, the location data processor 40 should detect the most likely point where the mobile telephone is located in the overlap area. However, if the estimated MS location area is too wide, the location data processor has difficulty determining the accurate location of the MS. That is, it is highly probable that errors occur in estimating the location of the MS when the selected estimated location area is too large.

The conventional location estimating method, therefore, can cause serious errors in estimating the location of an MS because the location area of the MS is estimated to be too large due to multipath fading and propagation delay.

SUMMARY OF THE INVENTION

It is, therefore, an object of the present invention to provide a mobile station (MS) locating method and system in which an MS location area is estimated using the time of arrival (TOA) method and then narrowing the MS location area using the inventive Angle of Arrival (AOA) system, in order to more accurately determine the location of an MS.

To achieve the above object, there is provided a method and system for locating a mobile station, and an AOA determining system. According to one aspect of the present invention, the MS is capable of communicating with at least three BSs, each having at least two antennas. To estimate the location of the MS, the distance between the MS and each BS is calculated based on the time of arrival (TOA) of an MS signal at the BS, a first estimated MS location area is defined as an overlap area of circles whose respective radius is the respective distance between the MS and the three BSs. Then, the location of the MS is estimated based on the time of signals received through two antennas provided in each BS, and then the angle of arrivals of the signal with respect to the antennas of each BS and the MS is utilized. Here, the angle is calculated from the phase difference between the received signals and the communication frequency of the signals. A second location area is defined as an area defined by the, lines derived from AOA operation, connecting the BSs to the MS. Then, the MS is determined to be located in the common area of the first and the second location areas.

In a system for estimating the location of an MS in a CDMA mobile communication system according to another aspect of the present invention, each of at least three BSs is capable of communicating with the MS and includes two different antennas for calculating the TOA, the TDOA, and the phase differences between the antennas. The system calculates a coarse AOA and an estimated AOA between the MS and the antennas based on the TOA, the TDOA, and the phase difference and determines a final AOA between the MS and the antennas. The MS is capable of communicating with the three BSs. A location data processor estimates first and second MS location areas from an MS signal received at the BSs, and determines a common area of the first and the second MS location areas as the real location of the MS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. For the purpose of clarity, well-known functions or constructions are not described in detail as they would obscure the invention in unnecessary detail.

Figure 1:
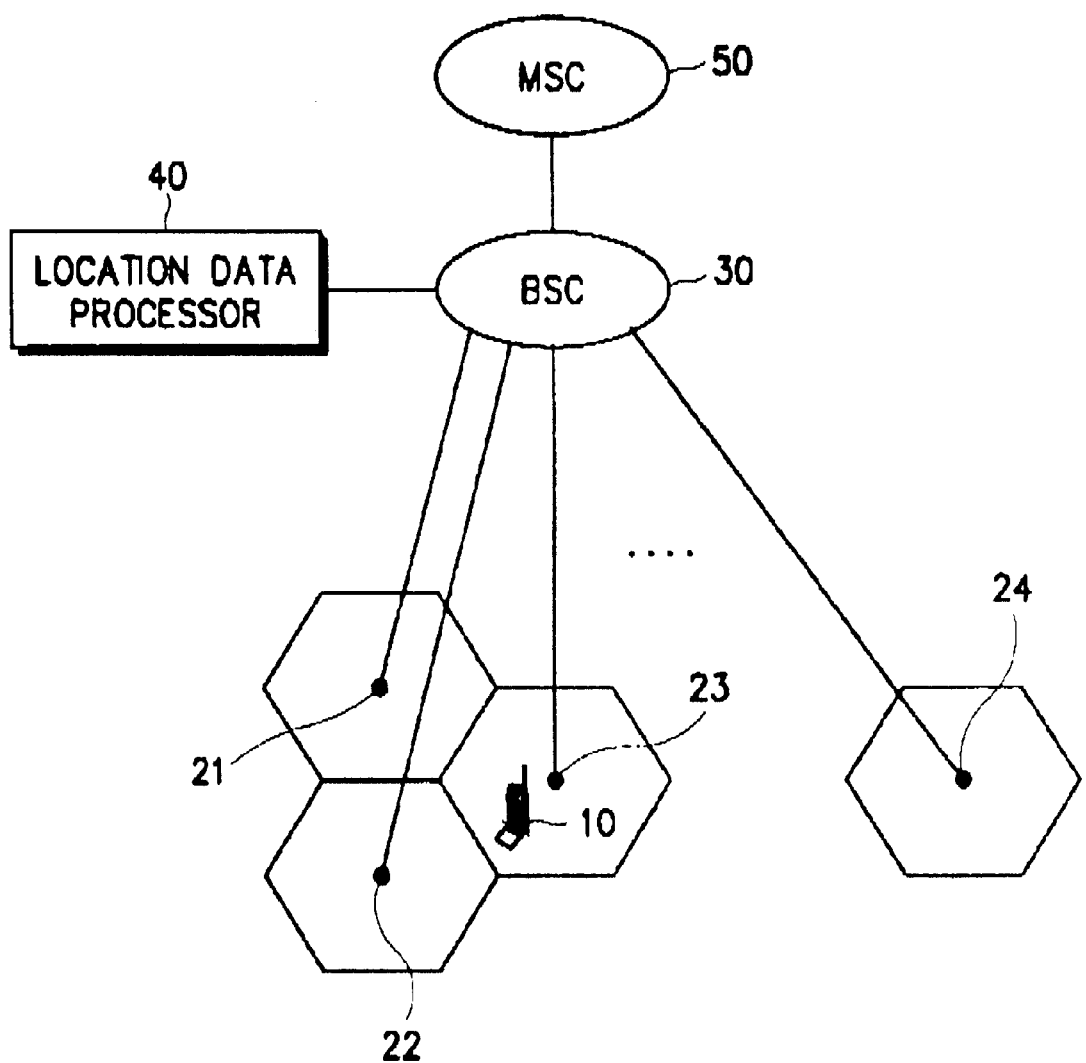
FIG. 1 illustrates a typical mobile telecommunication network configuration.
Figure 2:
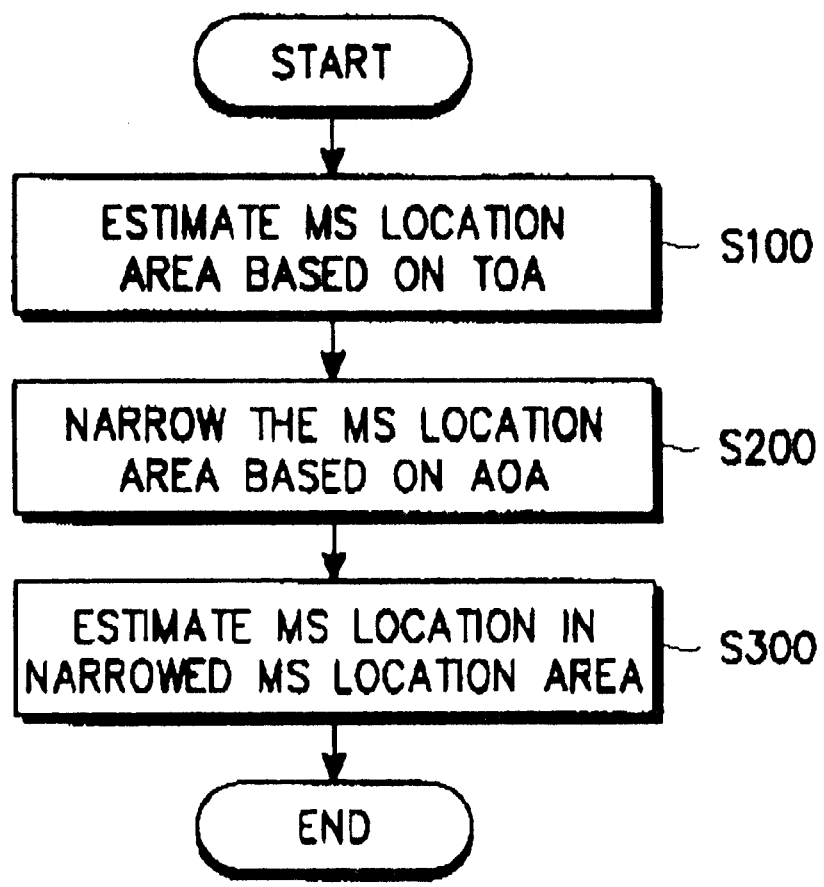
FIG. 2 is a flowchart illustrating the embodiment of an MS location estimating method according to the present invention.

FIG. 2 is a flowchart illustrating an MS location estimating method according to the present invention. Referring to FIG. 2, the MS location estimating method includes the steps of obtaining a first estimated MS location area (s100), obtaining a second estimated MS location area which is narrowed from the first estimated MS location area using AOAs of at least three BSs (s200), and determining the location of an MS in the second estimated MS location area (s300).

In step s100, the distance (TOA) between an MS and each BS is calculated from a predetermined RTD (Round Trip Delay) message, for obtaining the first estimated location area. Alternatively, a PUF (Power Up Function) signal received at the BS from the MS can be used instead of the RTD message. Hereinafter, the former case will be described.

Figure 3:
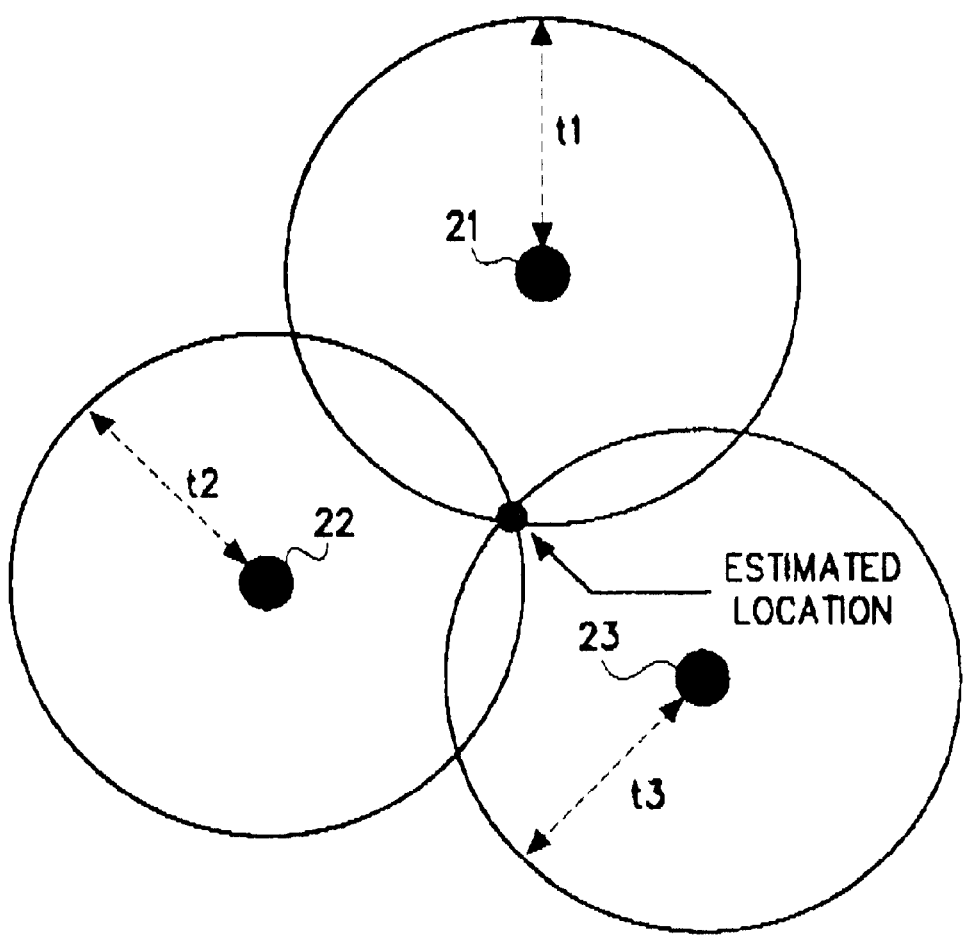
FIG. 3 illustrates an ideal location estimating method by the TOA trigonometry.

Referring to FIG. 3, if the first BS 21, for example, transmits an RTD message to an MS of interest, the MS returns the RTD message to the BS 21. The first BS 21 calculates the RTD of the message. Then, the TOA (t1) of the message between the MS and the first BS 21 is RTD/2. The TOAs (t2 and t3) of the BSs 22 and 23 are calculated in the same manner. The circles having the BSs 21, 22, and 23 at their centers are drawn based on these calculated TOAs. The radii of these circles represent the respective TOAs. Ideally, the circles of the BSs 21, 22, and 23 meet at one point as shown in FIG. 3. The intersection point is estimated as the location of the MS.

Figure 4:
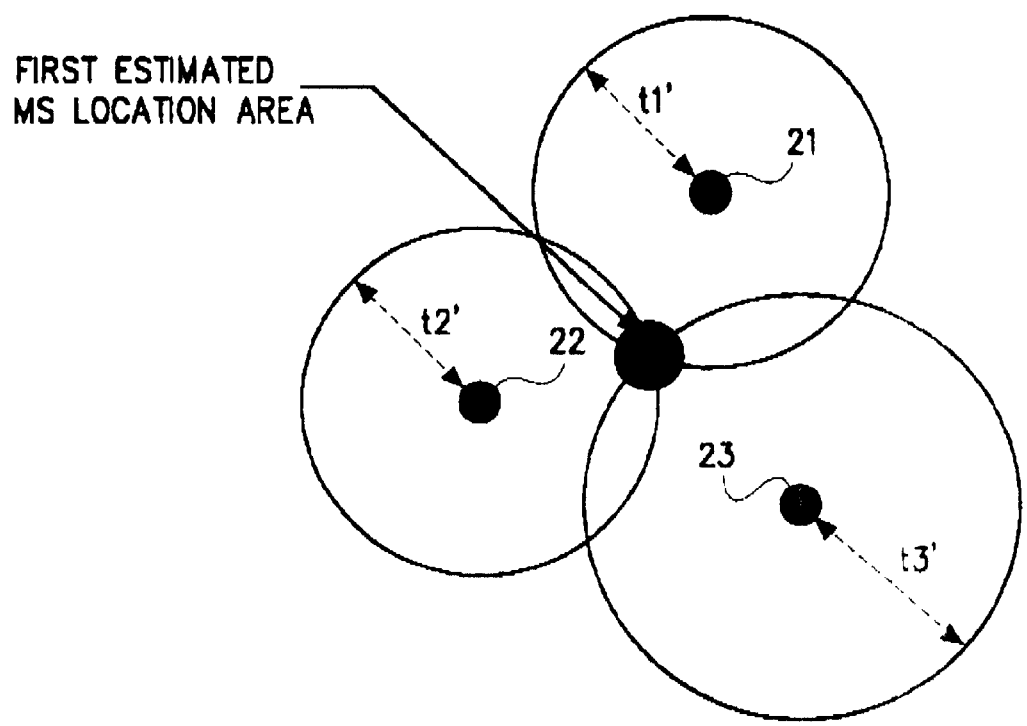
FIG. 4 illustrates MS location areas estimated by the TOA trigonometry.

However, a real radio environment involves time delay in the transmission or reception of an RTD message. An RTD measured in the real environment includes process delay in the processors of an MS and a BS and the propagation delay from a multiple reflection path. As depicted in FIG. 4, the varying TOAs from the center point of each BSs 21, 22, and 23 are represented by t1', t2', and t3'. Hence, these circles with the radii of the distance between the TOAs and the BSs 21, 22, and 23 intersect and overlap in a specific area, as shown in FIG. 4. Similarly, the MS is estimated to be located within this overlap area.

It can be said that the MS is positioned within the estimated location area and as the location area is smaller, the location of the MS can be determined more accurately. Therefore, the estimated MS location area is narrowed based on an AOA in the present invention. The narrowing of the location area will be described in detail in step s200. Each of the BSs 21, 22, and 23 has two antennas spaced apart by a predetermined distance in accordance with the present invention.

In step s200, a precise AOA of an MS signal is determined by the use of an AOA determining system, which includes two antennas spaced apart by a predetermined distance. To do so, the AOA determining system receives signals from the MS through the two antennas and removes ambiguities caused by the periodicity of a phase difference related to a geometric angle from the received signals. For the removal of ambiguities in determining a final AOA, the AOA determining system of the present invention also utilizes the TDOA (Time Difference of Arrival).

Figure 5:
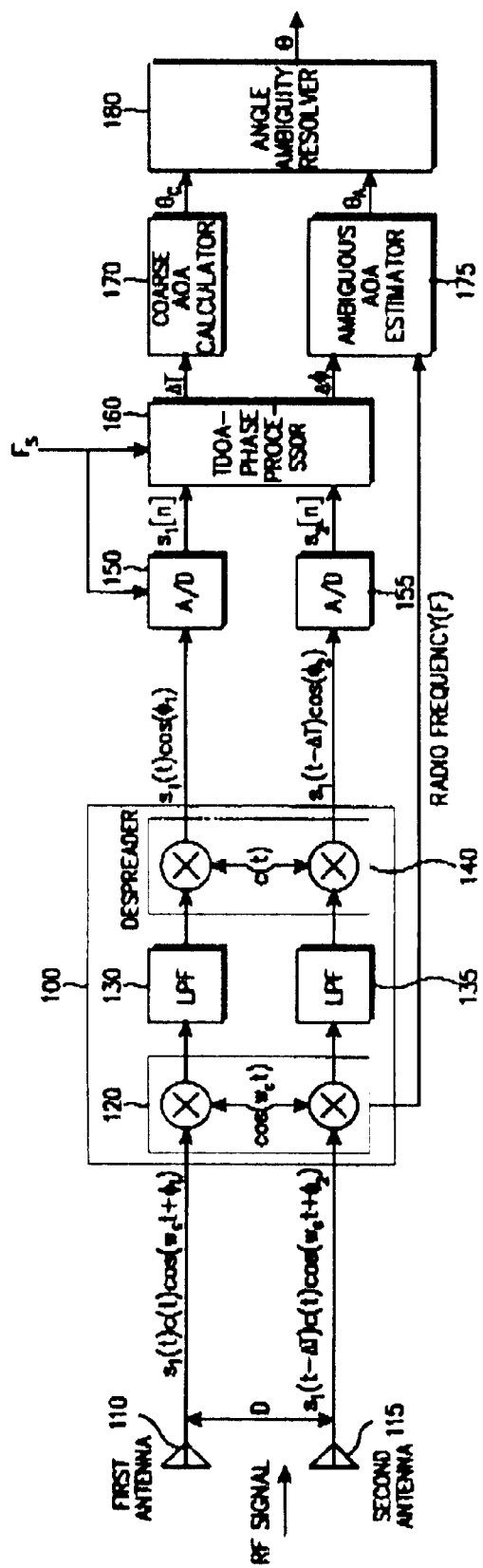
FIG. 5 is a block diagram of the embodiment of an AOA determining system according to the present invention.

FIG. 5 is a block diagram of the embodiment of an AOA determining system according to the present invention. In FIG. 5, the AOA determining system includes two antennas 110 and 115 spaced apart by a predetermined distance (D) for receiving the RF (Radio Frequency) signals of CDMA; a frequency down-converter 120 for downconverting the frequency of the RF signals received from the antennas 110 and 115; low pass filters (LPFs) 130 and 135 for low-pass-filtering the downconverted signals; a despreader 140 for despreading the signals received from the LPFs 130 and 135; ADCs (Analog-to-Digital Converters) 150 and 155 for converting the despread signals to digital signals; a TDOA-phase processor 160 for calculating the TDOA and the phase difference and between the two digital values received from ADC 150 and 155, respectively; a coarse AOA calculator 170 for calculating the coarse AOA using the TDOA; an ambiguous AOA estimator 175 for estimating a plurality of AOA values using the phase difference received from the TDOA-phase processor 160; and, an angle ambiguity resolver 180 for determining a fmal AOA value from the coarse AOA and the plurality of estimated AOA values. The operation and effect of the AOA determining system will be described referring to FIG. 6. The following description is conducted in the context of CDMA MS and CDMA BS.

Figure 6:
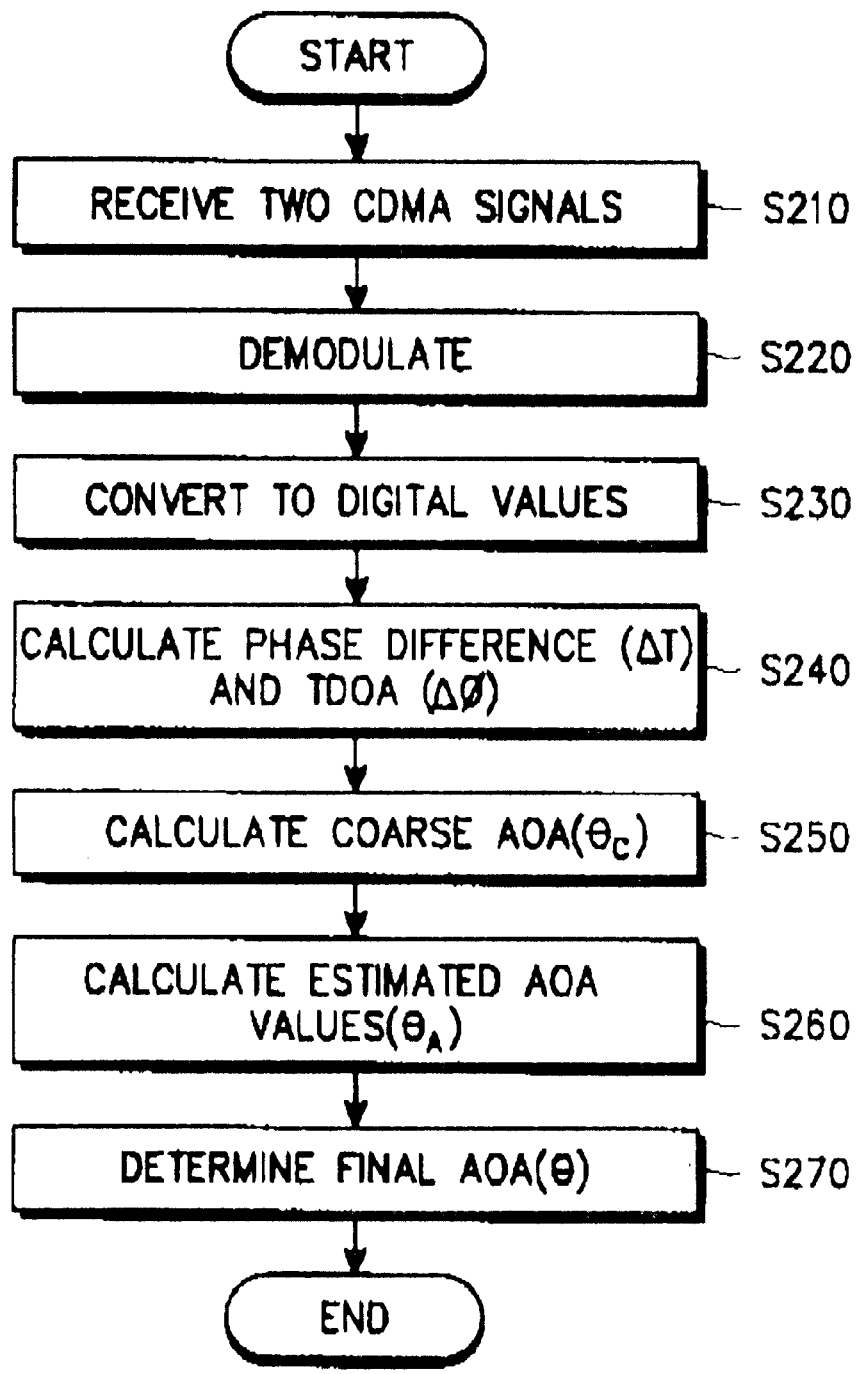
FIG. 6 is a flowchart illustrating an embodiment of an AOA determining method according to the present invention.

In FIG. 6, the two receiving antennas 110 and 115 spaced apart by a predetermined distance, D, receive RF signals from the MS at a predetermined radio frequency in CDMA in step s210. The received RF signals are converted to baseband signals by demodulation in step s220. If the received RF signals are $S_1(t)c(t)\cos(\omega_c' t+\phi_1)$ and $S_1(t-\Delta T)c(t)\cos(\omega_c' t+\phi_2)$, respectively, the frequency downconverter 120 removes the carrier components $\omega_c$ by mixing the two signals with $\cos(\omega_c' t)$. The LPFs 130 and 135 entirely remove the RF components possibly remaining in the carrier component-free signals. In CDMA, a narrow band signal is spread to a wide band signal by multiplying the narrow band signal by a code signal c(t) preset between the MS and the BS. Therefore, the despreader 140 despreads the output signals of the LPFs 130 and 135 by multiplying the signals by c(t). The baseband signals demodulated through frequency downconverting and despreading are $S_1(t)\cos \Phi_1$ and $S_1(t-\Delta T)\cos \Phi_2$.

In step s230, the ADCs 150 and 155 convert the baseband signals $S_1(t) \cos \Phi_1$ and $S_1(t-\Delta T)\cos \Phi_2$ into respective digital values through the process of sampling and quantization using the time reference at a predetermined sampling frequency $F_s$. If the sampled digital values of $S_1(t)\cos \Phi_1$ and $S_1(t-\Delta T)\cos \Phi_2$ are $s_1[n]$ and $s_2[n]$, respectively, the TDOA-phase processor 160 obtains the TDOA ($\Delta Y$) and the phase difference ($\Delta \Phi$) between $s_1[n]$ and $s_2[n]$ by correlation. For this purpose, the correlation of $s_1[n]$ and $s_2[n]$ is computed by the equation (1):

$$R(s_1, s_2)[k] = \sum_n s_1[n] \cdot s_2[n-k] \quad (1)$$

where if m is the maximum length of $s_1$ and $s_2$, n is an integer ranging from −m to m, and k is the number of samples.

To calculate $\Delta T$, $F_s$ is required. If k at a correlation peak is $K_{max}$ in Eq. 1, the time delay $\Delta T$ between $s_1[n]$ and $s_2[n]$ is represented by the equation (2):

$$\Delta T = \frac{K_{max}}{F_s} \quad (2)$$

The phase difference between $s_1[n]$ and $s_2[n]$ is achieved by selecting the sample points of a predetermined length and averaging them. That is, the TDOA-phase processor 160 derives the mean phase difference of the data from $\Delta T$. Assume that the number of samples in the sample points is n and $\psi(s_1[n'], s_2[n'])$ is the phase difference between $s_1[n]$ and $s_2[n]$, the mean phase difference $\Delta \Phi$ is determined by the equation (3):

$$\Delta \Phi = \frac{1}{n} \sum_{n=1}^{n} \Psi(s_1[n'], s_2[n']) \quad (3)$$

The coarse AOA calculator 170 calculates the coarse AOA ($\Theta_C$) based on the $\Delta T$ in step s250. To calculate $\Theta_C$, the TOAs of the signals received through the antennas 110 and 115 and the distance between the antennas 110 and 115 should be detected. The TOA is known in step s100.

Figure 7:
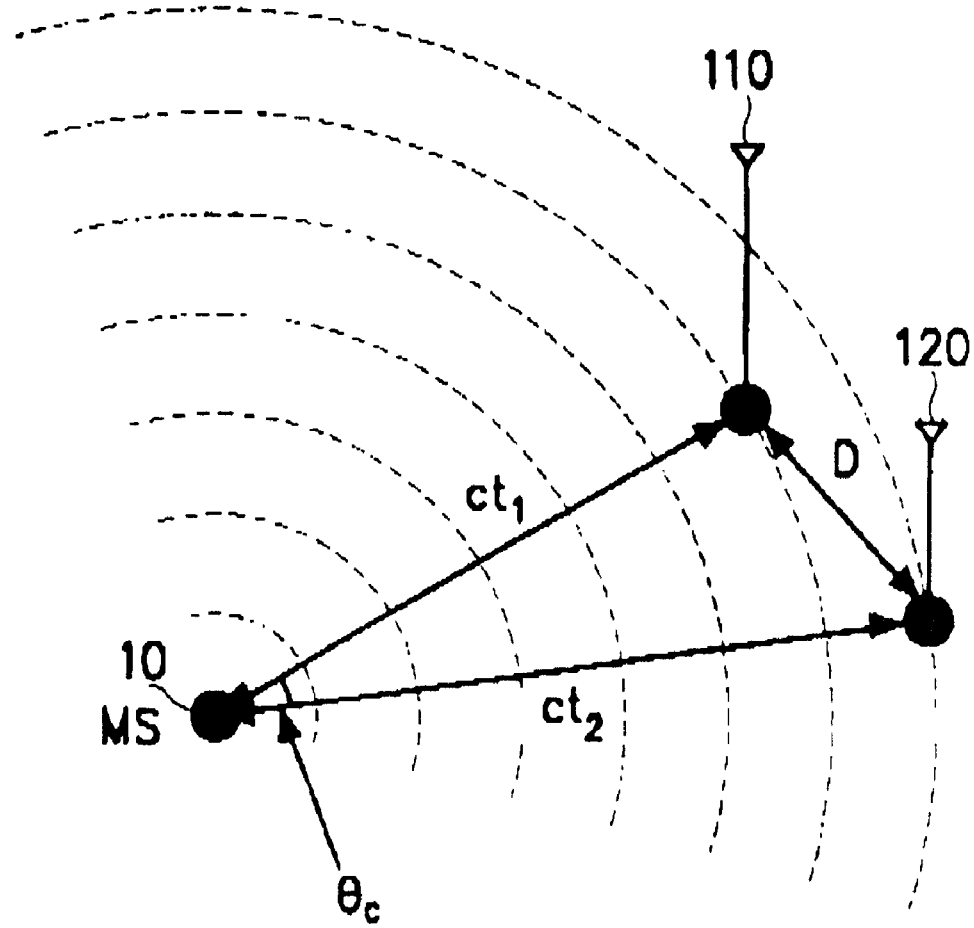
FIG. 7 illustrates the calculation of a coarse AOA.

The coarse AOA calculating method according to the present invention will be described in FIG. 7.

Let the TOAs of a signal received at the two antennas 110 and 115 from the MS be $t_1$ and $t_2$, respectively. A coarse AOA can be calculated from a triangle vector connecting the MS and the two antennas 110 and 115. The distance between the MS and the antennas 110 and 115 is $ct_1$ and $ct_2$, respectively, and the distance between the antennas 110 and 115 is D. Here, c is the speed of light and the lengths of the three sides of the triangle are thus known. Therefore, the coarse AOA calculator 170 computes $\Theta_C$ using a triangle area calculating formula and the Heron's formula for triangle area.

$$\tfrac{1}{2}(ct_1)(ct_2)\sin \Theta_c = \sqrt{(s-ct_1)(s-ct_2)(s-D)} \quad (4)$$

$$\Theta_c = \sin^{-1}\left(\frac{2}{c^2 t_1 t_2} \sqrt{(s-ct_1)(s-ct_2)(s-D)}\right) \quad (5)$$

where S is $$\frac{(ct_1 + ct_2 + D)}{2}$$

according to Heron's formula.

In step s260, the ambiguous AOA estimator 175 estimates a plurality of AOA values ($\Theta_A$) using the phase difference ($\Delta \Phi$) and the frequency (F) of the RF signals. If the number of the intended estimated AOA values is m and the wavelength of the radio frequency F is $\lambda$, $$\Theta_A = \arcsin\left(\frac{(\Delta \Phi + 2\pi m)\lambda}{2\pi D}\right) \quad (6)$$

where $\lambda = c/F$.

In step s270, the angle ambiguity resolver 180 selects an estimated AOA most approximate to $\Theta_C$ calculated in step s250 among the plurality of estimated AOA values ($\Theta_A$) as a final AOA ($\Theta$).

Each BS can acquire the final AOA by performing the above steps s210 to s270 with the use of the AQA determining system shown in FIG. 5. If the final AQA values calculated in the first, second, and third BSs 21, 22, and 23 are the first, second, and third AOA values, these values are used as MS direction finding parameters.

Figure 8:
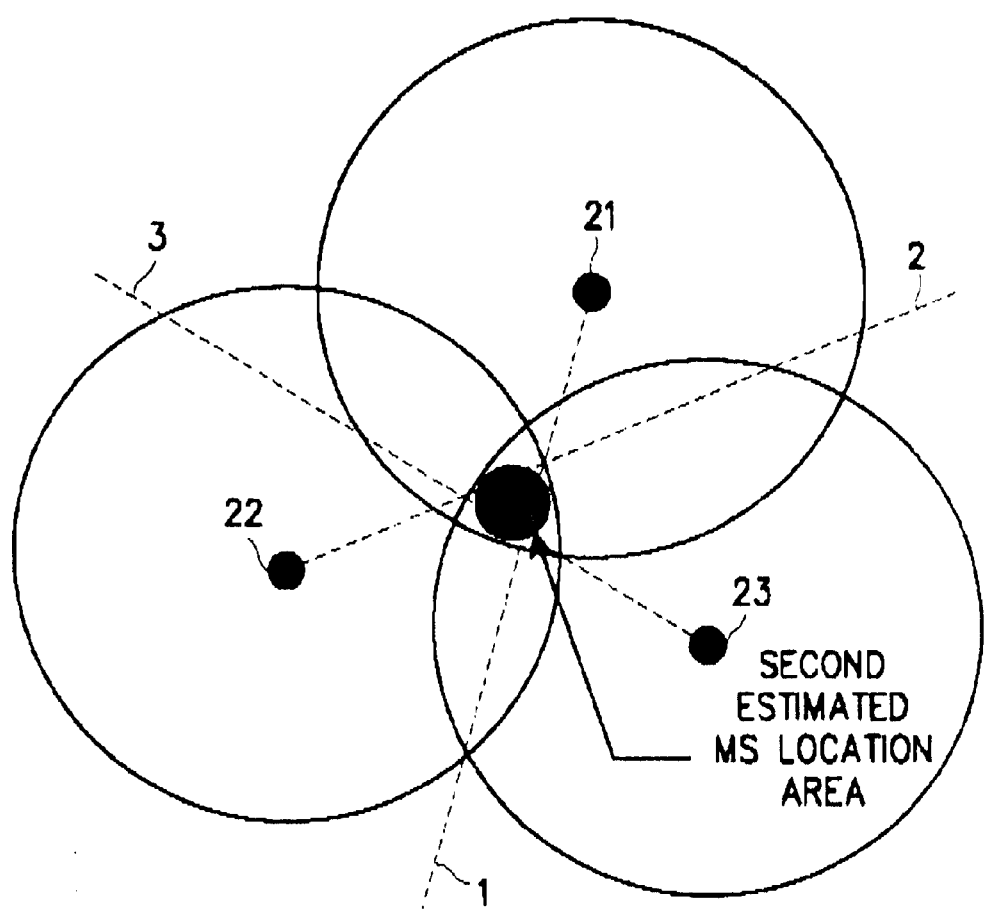
FIG. 8 illustrates the estimation of a second MS location area.

A location data processor determines the overlap area between a second estimated MS location area defined by three straight lines drawn based on the first, second, and third AOAs and the first estimated MS location area, as shown in FIG. 8. The second estimated MS location area is not always within the first estimated MS location area, as comparatively shown in FIGS. 4 and 8. Accordingly, the second estimated MS location area further narrows the first estimated MS location area. Three different line are drawn to location the MS based on the estimated final AOA and the corresponding BS so that these three lines can meet each other, defining the second estimated MS location area.

Accordingly, the location data processor estimates the MS to be located in the overlap area between the first and the second estimated location areas in step s300.

If the MS is located at a place where it can receive the RTD or the PUF signals from three BSs, the location of the MS can be tracked in accordance with the embodiments of the present invention. While the embodiments of the present invention have been illustratively described on this assumption, the present invention is not thus limited. Furthermore, while the BS calculates the TOA, it can be contemplated that an MS receives a transmission time from the BS, calculates the received time, and transmits the received time to thereby locate the MS.

As described above, the present invention ensures a more accurate estimation in locating the MS and minimizes the number of additional hardware devices required in the conventional mobile telecommunication network. Consequently, the cost involved in the estimation of an MS location can be reduced.

While the invention has been shown and described with reference to certain preferred embodiments thereof, it will be understood by those skilled in the art that various changes in form and detail may be made therein without departing from the spirit and the scope of the invention as defined by the appended claims.

What is claimed is:

1. A method for locating a mobile station (MS) capable of communicating with at least three base stations (BSs) each having at least two antennas, comprising the steps of:
    (a) calculating the respective distance between said MS and said each BS based on a Time of Arrival (TOA) method using an MS signal arriving at said each base station;
    (b) determining an overlap area, defining a first estimated MS location area, by an intersection of circles with each radius of said circles corresponding to said calculated distance between said MS and said each BS;
    (c) estimating the location of said MS based an Angle of Arrival method(AOA), defining a second estimated location area, wherein said AOA method includes the steps of:
        (c)(i) receiving time of signals received through two antennas of said each BS;
        (c)(ii) estimating the MS location based on an angle between said each antenna of said each BS with respect to said MS, wherein said angle is calculated from the phase difference between the received signals and a communication frequency of the signals; and
        (c)(iii) estimating said second location area defined by the lines connecting said each BS to said MS based on said AOA method; and,
    (d) determining a new location of said MS defined by a common area of said first location area and said second location area.

2. The method of claim 1, wherein said step of estimating said first location comprises the steps of:
    calculating the respective distance between said MS and said each BS based on said MS signal arriving at said each BS;
    drawing the respective circle using said calculated distance between said MS and said each BS as respective radius with respect to said each circle; and,
    estimating said overlap area of said three circles as said first location area.

3. The method of claim 1, wherein said step of estimating said second location area comprises the steps of:
    calculating a coarse Angle of Arrival (AOA ($\theta$)) between said MS and said antennas of said each BS based on a Time Difference Of Arrival (TDOA) of said signals received through said two antennas;
    estimating a plurality of AOA values between said MS and said two antennas of said each BS using a phase difference of said signals received and a communication frequency; and,
    determining an AOA most approximate to said calculated coarse AOA among said plurality of said estimated AOA values as a final AOA value.

4. The method of claim 3, wherein said time difference ($\Delta T$) is calculated by the following equation:

$$\Delta T = \frac{K_{max}}{F_s}$$

wherein $F_s$ representing a sampling frequency in digital conversion is $F_s$ and $K_{max}$ representing a correlation peak which is represented by $$R(s_1, s_2)[k] = \sum_{-m}^{m} s_1[n] \cdot s_2[n-k],$$

wherein $s_1[n]$ and $s_2[n]$ represent converted sample digital values converted from said received signals at said respective antenna, m representing the maximum length of $s_1$ and $s_2$, and represents the number of samples of the maximum length of $s_1$ and $s_2$.

5. The method of claim 4, wherein said coarse AOA ($\theta$) is calculated by the following equation:

$$\theta = \sin^{-1}\left(\frac{2}{c^2 t_1 t_2}\sqrt{(s-ct_1)(s-ct_2)(s-D)}\right)$$

wherein c represents the speed of light, $ct_1$ represents the distance between said MS and one of said antennas of said BS, $ct_2$ represents the distance between said MS and said another antenna, and D represents the distance between said two antennas.

6. The method of claim 5, wherein in said phase difference ($\Delta\Phi$) is calculated by the following equation:

$$\Delta\Phi = \frac{1}{n}\sum_{n=1}^{n} \Psi(s_1[n'], s_2[n'])$$

wherein $s_1[n']$ and $s_2[n']$ represents the converted sample digital values converted from said received signals at said respective antenna, $\psi(s_1[n'], s_2[n'])$ represents said phase difference between $s_1[n']$ and $s_2[n']$, and n represents the number of samples of the maximum length of $s_1$ and $s_2$.

7. The method of claim 1, wherein said MS signal comprises an RTD (Round Trip Delay) signal for communicating between said MS and said each BS.

8. The method of claim 1, wherein said MS signal comprises a PUF (Power Up Function) signal for communicating between said MS and said each BS.

9. A system for estimating the location of an MS in a CDMA mobile communication system, comprising:
    at least three BSs, each having two different antennas spaced a part by a predetermined distance, for calculating a Time of Arrival (TOA) based on an MS signal received at said each BS, for calculating a Time Difference of Arrival (TDOA) and a phase difference of signals arriving at said two antennas of said each BS, and for determining a final Angle of Arrival (AOA) between said MS and said two antennas of said each BS based on said calculated TDOA, said phase difference, and a communication frequency of said MS;
    said MS capable of communicating with said three BSs;

a location data processor for estimating a first MS location area and a second MS location area using an MS signal arriving at said each BS and for determining a common area of said first MS location area and said second MS location area; and, wherein said first MS location area is determined using a Time of Arrival (TOA) method and said second MS location area is determined using an Angle of Arrival (AOA) method, and wherein the location of said MS is defined by a common area of said first MS location area and said second MS location area.

10. The system of claim 9, wherein said each BS comprises:

a demodulator for demodulating two RF signals received through said antennas of said BS to baseband signals;

an analog-to-digital converter for converting said demodulated baseband signals into digital values;

a signal processor for calculating said TDOA and said phase difference of said converted digital values;

a coarse AOA calculator for calculating a coarse AOA based on said calculated TDOA;

an ambiguous AOA estimator for estimating a plurality of AOA values based on said phase difference of said converted digital values; and, an angle ambiguity resolver for determining said final AOA by determining an estimated AOA most approximate to said coarse AOA among said plurality of said estimated AOA values.

* * * * *